United States Patent
Zhang (10) Patent No.: US 9,237,227 B2
(45) Date of Patent: Jan. 12, 2016

(54) COMMUNICATIONS DEVICES, ASSOCIATED APPARATUS AND METHODS (75) Inventor: Liang Zhang, Beijing (CN)

(73) Assignee: Nokia Technologies Oy, Espoo (FI)

(*) Notice: Subject to any disclaimer, the term of this patent is extended or adjusted under 35 U.S.C. 154(b) by 0 days.

(21) Appl. No.: 14/365,270

(22) PCT Filed: Dec. 20, 2011

(86) PCT No.: PCT/CN2011/084302
§ 371 (c)(1),
(2), (4) Date: Jun. 13, 2014

(87) PCT Pub. No.: WO2013/091178
PCT Pub. Date: Jun. 27, 2013

(65) Prior Publication Data
US 2014/0335836 A1 Nov. 13, 2014

(51) Int. Cl.
*H04M 3/42* (2006.01)
*G06F 3/16* (2006.01)
(Continued)

(52) U.S. Cl.
CPC .......... *H04M 3/42153* (2013.01); *G06F 3/165* (2013.01); *H04M 1/72569* (2013.01); *H04M 19/041* (2013.01)

(58) Field of Classification Search
CPC .................... H04M 3/42153; H04M 1/72569; G06F 3/165
USPC ............................. 455/414.1, 417, 418, 550.1
See application file for complete search history.

(56) References Cited

U.S. PATENT DOCUMENTS

| 5,396,264 A | * | 3/1995 | Falcone | ................ G06F 3/0482 340/7.55 |
| 2012/0015693 A1 | * | 1/2012 | Choi | ................ H04M 1/72566 455/566 |

(Continued)

FOREIGN PATENT DOCUMENTS

| CN | 1622564 | 6/2005 |
| CN | 101610307 | 12/2009 |

(Continued)

OTHER PUBLICATIONS

International Search Report for International Application No. PCTCN2011/084302—Date of Completion of Search: May 4, 2012—3 pages.

(Continued)

*Primary Examiner* — Khai M Nguyen
(74) *Attorney, Agent, or Firm* — Locke Lord LLP (57) ABSTRACT

An apparatus comprising:
  at least one processor; and
  at least one memory including computer program code,
  the at least one memory and the computer program code configured to, with the at least one processor, cause the apparatus to perform at least the following:
  identify a preferential use setting of a communications device, the preferential use setting being associated with a remote contact, or with a use pattern of the communications device, and being configured to provide a supplementary communication function during communications; and
  automatically activate the identified preferential use setting of the communications device when the communications device is used to communicate with the associated remote contact, or to communicate in accordance with the associated use pattern of the communications device.

17 Claims, 8 Drawing Sheets

(51) Int. Cl.
 *H04M 1/725* (2006.01)
 *H04M 19/04* (2006.01)

(56) References Cited

U.S. PATENT DOCUMENTS

2012/0315960 A1* 12/2012 Kim .................. H04W 52/0254
 455/574
2015/0011204 A1* 1/2015 Seo et al. ....................... 455/419

FOREIGN PATENT DOCUMENTS

| CN | 101699838 | 4/2010 |
| CN | 101964847 | 2/2011 |

OTHER PUBLICATIONS

PCT Written Opinion of the International Searching Authority for International Application No. PCTCN2011/084302—Date of Completion of Opinion: May 25, 2012—6 pages.

English Language Machine Translation of Chinese Publication No. CN1622564—17 pages.

English Language Machine Translation of Chinese Publication No. CN101610307—16 pages.

English Language Machine Translation of Chinese Publication No. CN101699838—20 pages.

English Language Machine Translation of Chinese Publication No. CN 101964847—20 pages.

* cited by examiner

COMMUNICATIONS DEVICES, ASSOCIATED APPARATUS AND METHODS

TECHNICAL FIELD

The present disclosure relates to the field of communications devices, associated methods, computer programs and apparatus. Certain disclosed aspects/embodiments relate to portable electronic communications devices, in particular, so-called hand-portable electronic communications devices which may be hand-held in use (although they may be placed in a cradle in use). Such hand-portable electronic devices include so-called Personal Digital Assistants (PDAs) and tablet personal computers.

The portable electronic communications devices/apparatus according to one or more disclosed aspects/embodiments may provide one or more audio/text/video communication functions (e.g. tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Electronic devices may be configured to allow communication, such as audio communication, with other electronic devices. Some electronic devices are configured to apply default settings when the communications are ongoing (e.g. volume of the speaker). These default settings affect the default behaviour of the electronic device.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

In a first aspect, there is provided an apparatus comprising:
at least one processor; and
at least one memory including computer program code,
the at least one memory and the computer program code configured to, with the at least one processor, cause the apparatus to perform at least the following:
identify a preferential use setting of a communications device, the preferential use setting being associated with a remote contact, or with a use pattern of the communications device, and being configured to provide a supplementary communication function during communications; and
automatically activate the identified preferential use setting of the communications device when the communications device is used to communicate with the associated remote contact, or to communicate in accordance with the associated use pattern of the communications device.

It will be appreciated that a communications device may provide primary communications functions (e.g. a telephone may provide a primary audio communication function). Primary communications functions may include one or more of, for example, providing for audio communication, providing textual messaging, providing email messaging, providing SMS messaging, providing MMS messaging or providing for video communication.

A remote contact may be a user of another communications device. A remote contact may be associated with a user identification, the user identification corresponding to a user (e.g. email address, user name). A remote contact may be another communications device (e.g. a mobile phone, a laptop, server). A remote contact may be associated with a device identification, the device identification corresponding to a device (e.g. Internet Protocol (IP) address, phone number).

Supplementary communication functions may be considered to be functions relating to, affecting, or augmenting the primary communication function. For example, providing for video communication (or a keypad) may be considered a supplementary communication function for a telephone as it augments the primary audio communication function. Likewise, the speaker volume may be considered a supplementary communication function for a telephone as it relates to and affects the primary audio communication function.

The remote contact may be associated with one or more of, for example, a user name, a phone number, an email address, and a user identification number.

The preferential use settings may be identified by one or more of:
determining user preference settings in the communications device;
determining a usage pattern of the communications device; and
determining use of the communications device during one or more prior communications with the remote contact.

The preferential use settings may be associated with a remote contact, and/or with a use pattern of the communications device in response to a user input (e.g. selecting a preferential use setting to be associated with a particular remote contact). The preferential use settings may be associated with a remote contact, or with a use pattern of the communications device in response to a determining a usage pattern of the communications device; and/or determining use of the communications device during one or more prior communications with the remote contact.

The use pattern may be a temporal use pattern. A temporal use pattern may be based on the frequency of communications, the time of day, day of the week, and/or date.

The preferential use setting may be one or more of:
the use of a particular supplementary communication function (e.g. providing a keypad, providing audio or visual communication, providing data transfer facilities); and
the setting of a particular communication function (e.g. volume, display brightness, the mode of communication such as speaker mode or handset mode).

A communications device may comprise default settings for the supplementary function of the communications device as well as preferential settings. For example, the apparatus may be configured to provide a default setting for a volume supplementary communication function (e.g. set to level 3). The preferential setting may be the settings selected by, or confirmed by, the user.

The apparatus may be configured to:
automatically activate the identified preferential use setting of the communications device when communication with the remote contact is initiated. Initiating a communication with a remote device may be considered to encompass: accepting an incoming call and pressing the dial button. That is, the communication may be requested by either the communications device or by the remote device.

The apparatus may be configured to automatically activate the identified preferential use setting of the communications device in response to one or more of:
receiving a call from the remote contact; and
initiating a call to the remote contact.

The remote contact may be associated with multiple communication channels, and the same preferential use setting may be associated with one or more of the respective multiple communications channels. For example, a remote contact may have a communication channel associated with a mobile phone and a communication channel associated with a landline phone, and the preferential use setting (e.g. the speaker volume) may be configured to be the same for both communication channels.

The remote contact may be associated with multiple communication channels, and respective preferential use settings are provided for two or more of the respective multiple communications channels.

The remote contact may be a pre-existing contact available in a stored contacts directory for the communications device. The remote contact may be associated with a new call to the communications device from a previously unknown caller.

The preferential use settings may comprise the use settings of a plurality of supplementary functions.

Determining use of the communications device during one or more prior communications may comprise determining the last setting or the most popular setting for the supplementary function.

The setting may be that the supplementary function is not used.

The apparatus may be configured to:
identify a preferential use setting of a communications device, the preferential use setting being associated with a remote contact, or with a use pattern of the communications device, and being configured to provide a supplementary communication function during use of the communications device in a first communication with the associated remote contact; and
automatically activate the identified preferential use setting of the communications device when the communications device is used in a second communication with the remote contact.

A second communication may be the immediately subsequent communication to the first communication. A second communication may be a subsequent communication to the first communication.

The apparatus may be configured to determine one or more of:
the preferential use setting based on previous communications; and
the preferential use setting based on the last predetermined number of communications (e.g. the most common preferential setting used during the last predetermined number of calls (e.g. the last ten calls)). For example, if during the last ten calls to a remote contact, the user set the used a virtual numeric keypad 6 times, the apparatus would be configured to enable the numeric keypad automatically.

The apparatus may be at least one of a portable device, circuitry for a portable electronic device, a laptop computer, a desktop computer, a mobile phone, a Smartphone, a tablet PC, a personal digital assistant, the portable communications device or a module for the same.

In a second aspect, there is provided a method, the method comprising:
identifying a preferential use setting of a communications device, the preferential use setting being associated with a remote contact, or with a use pattern of the communications device, and being configured to provide a supplementary communication function during communications; and
automatically activating the identified preferential use setting of the communications device when the communications device is used to communicate with the associated remote contact, or to communicate in accordance with the associated use pattern of the communications device.

In a third aspect, there is provided a computer program comprising computer program code configured to:
identify a preferential use setting of a communications device, the preferential use setting being associated with a remote contact, or with a use pattern of the communications device, and being configured to provide a supplementary communication function during communications; and
automatically activate the identified preferential use setting of the communications device when the communications device is used to communicate with the associated remote contact, or to communicate in accordance with the associated use pattern of the communications device.

The computer program may be stored on a storage media (e.g. on a CD, a DVD, a memory stick or other non-transitory medium). The computer program may be configured to run on a device or apparatus as an application. An application may be run by a device or apparatus via an operating system. The computer program may form part of a computer program product.

In a fourth aspect, there is provided an apparatus comprising:
means for identifying configured to identify a preferential use setting of a communications device, the preferential use setting being associated with a remote contact, or with a use pattern of the communications device, and being configured to provide a supplementary communication function during communications; and
means for activating configured to automatically activate the identified preferential use setting of the communications device when the communications device is used to communicate with the associated remote contact, or to communicate in accordance with the associated use pattern of the communications device.

In a fifth aspect, there is provided an apparatus comprising:
at least one processor; and
at least one memory,
the apparatus configured to perform at least the following:
identify a preferential use setting of a communications device, the preferential use setting being associated with a remote contact, or with a use pattern of the communications device, and being configured to provide a supplementary communication function during communications; and
automatically activate the identified preferential use setting of the communications device when the communications device is used to communicate with the associated remote contact, or to communicate in accordance with the associated use pattern of the communications device.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

Corresponding computer programs for implementing one or more of the methods disclosed are also within the present disclosure and encompassed by one or more of the described embodiments.

The above summary is intended to be merely exemplary and non-limiting.

BRIEF DESCRIPTION OF THE FIGURES

A description is now given, by way of example only, with reference to the accompanying drawings, in which.

DESCRIPTION OF EXAMPLE ASPECTS/EMBODIMENTS

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

It is common for electronic devices to provide communications functions. For example, a telephone may allow for audio communication and a computer may allow for video conferencing. Some communications devices allow the behaviour of the device to be adjusted by the device settings. For example, the communications device may be configured such that the user can adjust the volume of the speaker.

However, it may be beneficial to store preferential use settings in association with a particular contact and/or usage pattern. Example embodiments contained herein may be considered to allow a preferential use setting to be associated with a remote contact, or with a use pattern of the communications device, such that the preferential use setting of the communications device is automatically activated when the communications device is used to communicate with the associated remote contact, or to communicate in accordance with the associated use pattern of the communications device. This may allow the communications device to automatically predict the desired settings for a particular situation. For example, if a particular remote contact tends to talk very loudly, the communications device can be configured such that, when a call is established to that remote contact, a low speaker volume is automatically activated (e.g. to compensate for his speech volume), rather than requiring manual adjustment. Likewise, if there is a particular pattern of use (e.g. the user likes to use video conference in the evening but only audio communication in the morning), the device may be configured to automatically active these preferential use settings based on the particular usage pattern. This may allow a more efficient and intuitive user interface.

Figure 1:
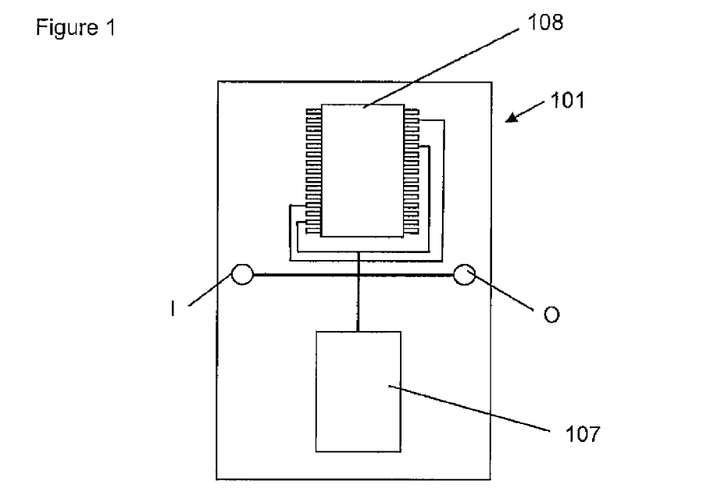
FIG. 1 depicts an embodiment comprising a number of electronic components, including memory and a processor.

FIG. 1 shows an apparatus (101) comprising memory (107), a processor (108), input I and output O. In this embodiment only one processor and one memory are shown but it will be appreciated that other embodiments may utilise more than one processor and/or more than one memory (e.g. same or different processor/memory types).

In this embodiment the apparatus (101) is an application specific integrated circuit (ASIC) for a portable electronic device with a touch sensitive display. In other embodiments the apparatus (101) can be a module for such a device, or may be the device itself, wherein the processor (108) is a general purpose CPU of the device and the memory (107) is general purpose memory comprised by the device.

The input I allows for receipt of signalling to the apparatus 101 from further components, such as components of a portable electronic device (like the touch-sensitive display 240) or the like. The output O allows for onward provision of signalling from within the apparatus 101 to further components. In this embodiment the input I and output O are part of a connection bus that allows for connection of the apparatus 101 to further components.

The processor 108 is a general purpose processor dedicated to executing/processing information received via the input I in accordance with instructions stored in the form of computer program code on the memory 107. The output signalling generated by such operations from the processor 108 is provided onwards to further components via the output O.

The memory 107 (not necessarily a single memory unit) is a computer readable medium (solid state memory in this example, but may be other types of memory such as a hard drive, ROM, RAM, Flash or the like) that stores computer program code. This computer program code stores instructions that are executable by the processor 108, when the program code is run on the processor 108. The internal connections between the memory 107 and the processor 108 can be understood to, in one or more embodiments, provide an active coupling between the processor 108 and the memory 107 to allow the processor 108 to access the computer program code stored on the memory 107.

In this embodiment the input I, output O, processor 108 and memory 107 are all electrically connected to one another internally to allow for electrical communication between the respective components I, O, 108, 107. In this example the components are all located proximate to one another so as to be formed together as an ASIC, in other words, so as to be integrated together as a single chip/circuit that can be installed into an electronic device. In other embodiments one or more or all of the components may be located separately from one another.

Figure 2:
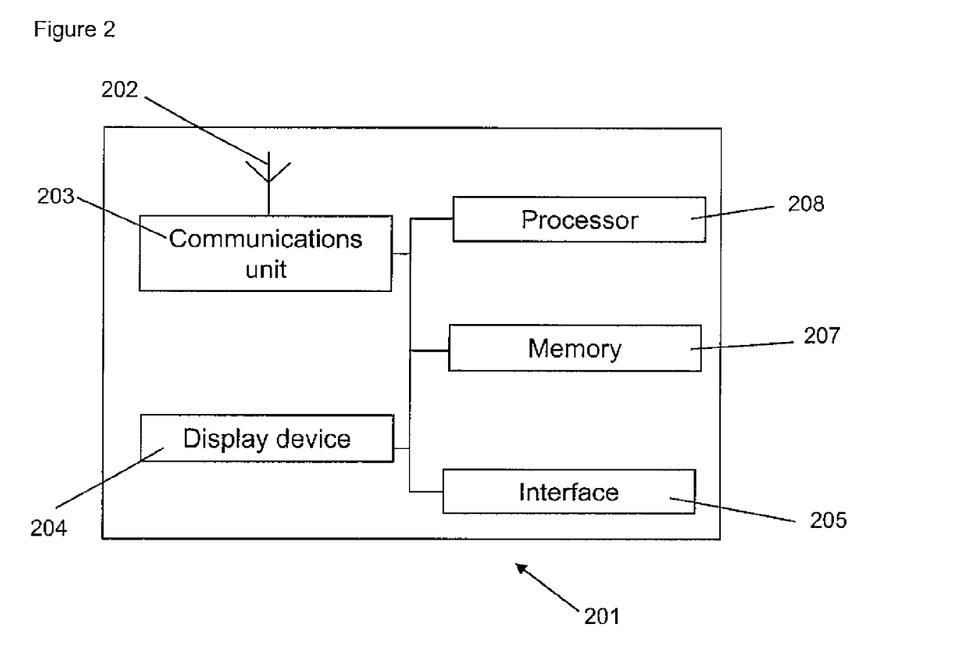
FIG. 2 depicts an embodiment comprising a number of electronic components, including memory, a processor and a communication unit.

FIG. 2 depicts an apparatus (201) of a further example embodiment, such as a mobile phone. In other example embodiments, the apparatus (201) may comprise a module for a mobile phone (or PDA or audio/video player), and may just comprise a suitably configured memory (207) and processor (208).

The example embodiment of FIG. 2, in this case, comprises a display device (204) such as, for example, a Liquid Crystal Display (LCD) or touch-screen user interface. The apparatus (201) of FIG. 2 is configured such that it may receive, include, and/or otherwise access data. For example, this example embodiment (201) comprises a communications unit (203), such as a receiver, transmitter, and/or transceiver, in communication with an antenna (202) for connecting to a wireless network and/or a port (not shown) for accepting a physical connection to a network, such that data may be received via one or more types of networks. This example embodiment comprises a memory (207) that stores data, possibly after being received via antenna (202) or port or after being generated at the user interface (205). The processor (208) may receive data from the user interface (205), from the memory (207), or from the communication unit (203). It will be appreciated that, in certain example embodiments, the display device (204) may incorporate the user interface (205). Regardless of the origin of the data, these data may be outputted to a user of apparatus (201) via the display device (204), and/or any other output devices provided with apparatus. The processor (208) may also store the data for later use in the memory (207). The memory (207) may store computer program code and/or applications which may be used to instruct/enable the processor (208) to perform functions (e.g. read, write, delete, edit or process data).

Figures 3A, 3B:
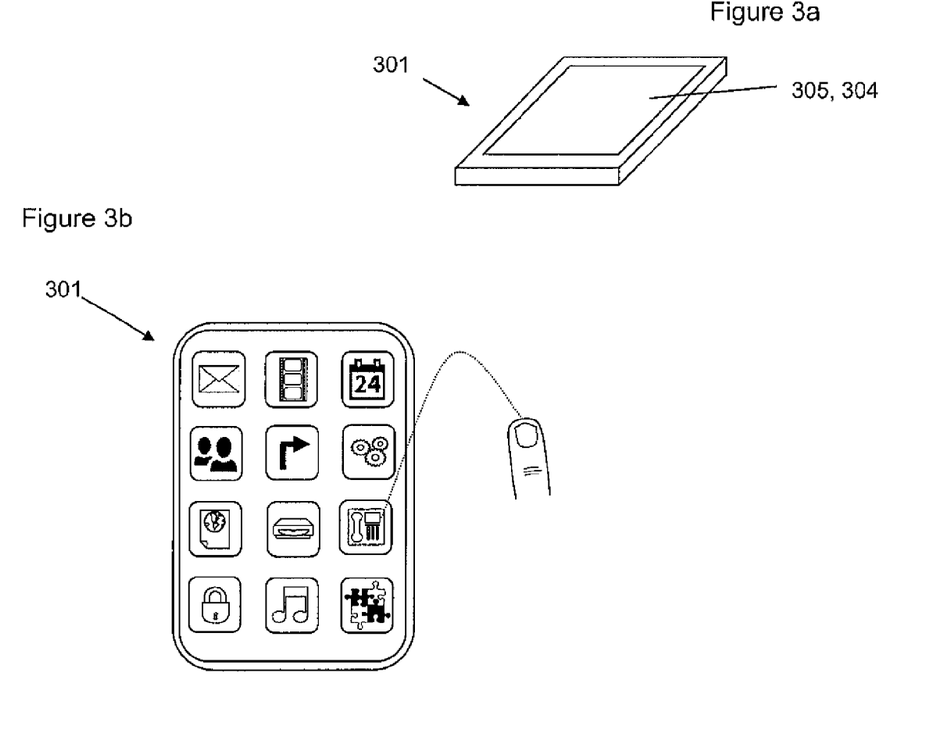
FIG. 3a illustrates an example embodiment comprising a touch-screen.
FIG. 3b-3f depicts the example embodiment of FIG. 2 wherein the supplementary function relates to the volume of the speaker.

FIG. 3a depicts an example embodiment of the apparatus depicted in FIG. 2 comprising a portable electronic communications device (301), e.g. such as a mobile phone, with a user interface comprising a touch-screen user interface (305, 304), a memory (not shown), a processor (not shown) and an antenna (not shown) for transmitting and/or receiving data (e.g. emails, textual messages, phone calls, information corresponding to web pages).

FIGS. 3b-3f depict the embodiment of FIG. 3a as the user is interacting with the device. FIG. 3b depicts the home screen of the electronic device when the device is first turned on. The home screen depicts an array of icons wherein each icon represents a different application available to the user. In this case the applications comprises, an email client, a movie player, a calendar application, a messaging application, a navigation application, a settings control application, a web browser application, a external device interface application, a telephone application, a locking application, an music player application, and a games application.

In this case, the user wishes to make a telephone call communication to his friend Dave (i.e. a remote contact), so therefore selects the telephone application by selecting the telephone application icon. This opens the telephone application (depicted in FIG. 3c).

Figure 3C:
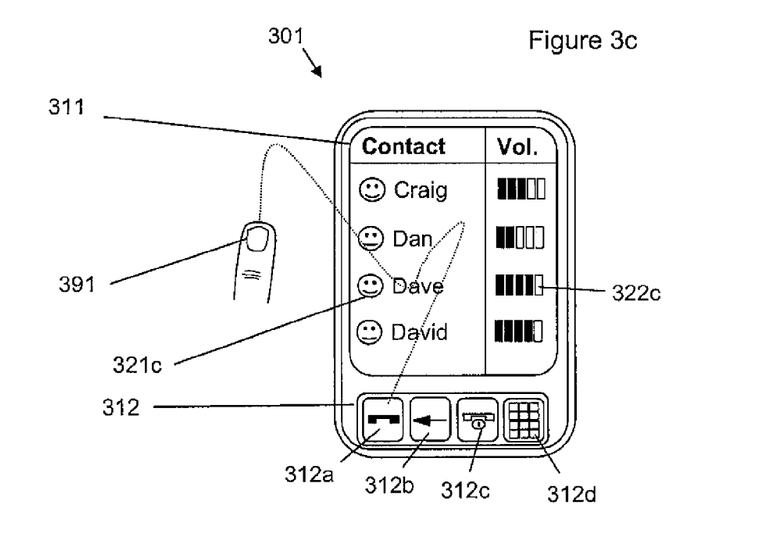

When the telephone application is running, the display comprises a contact list region (311) and an icon region (312). The contact list region (311) comprises a list of contacts wherein each contact (321c) is associated with a volume preferential use setting (322c). In this case the volume preferential use setting is configured to provide a supplementary communication function during communications by adjusting the volume of the speaker of the communications device. The icon region comprises: an initiate call icon (312a) configured to enable the user to initiate a telephone communication with a selected contact; a back icon (312b) configured to enable the user to return to the previous screen; a terminate call icon (312c) configured to enable the user to terminate an ongoing call; and a numeric keypad icon (312d) configured to make a numeric keypad available to the user (e.g. to enter a number not associated with a stored contact).

In this case the user wishes to call the remote contact 'Dave', and so selects the contact by interacting with the corresponding contact user interface element (e.g. by tapping or hovering over the stylus, which in this case, is his finger (391)) and pressing the initiate call icon (321a). In response to the user selecting the initiate call icon, the apparatus is configured to identify the volume preferential use setting of a communications device, the volume preferential use setting being associated with a remote contact and being configured to provide a volume level supplementary communication function during communications; and when the call is initiated, automatically activate the identified preferential use setting of the communications device when the communications device is used to communicate with the associated remote contact. That is, in this case, as the communication is to the remote contact 'Dave' (321c), the volume level is automatically set to level 4 (i.e. the identified volume preferential use setting (322c)).

Figure 3D:
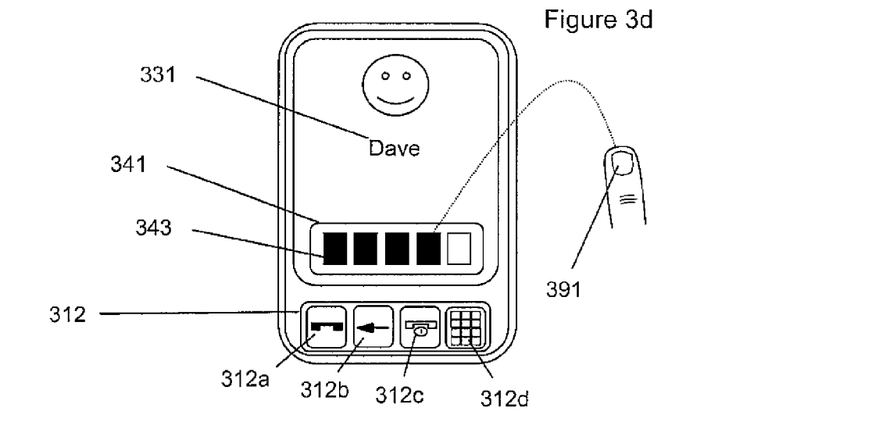
Figure 3E:
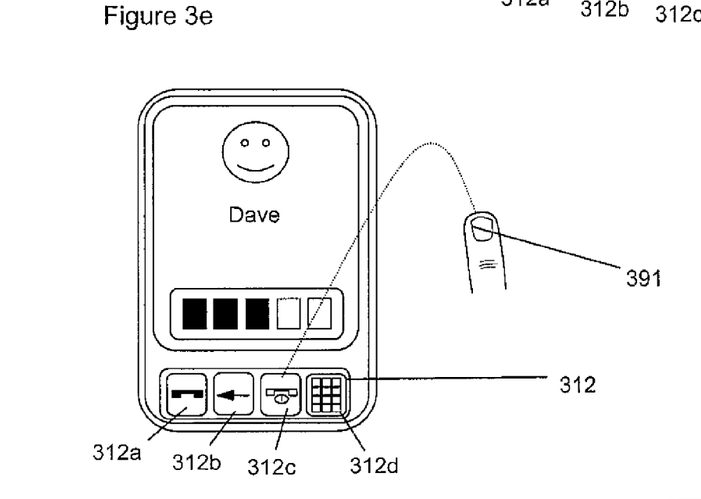

When the call is ongoing (as depicted in FIG. 3d), the display is configured to indicate the remote contact (331), and to provide: a volume preferential use setting region (341), comprising a five bars (343) indicating the volume preferential use setting; and the icon region (312). In this case the volume preferential use setting region is configured such that the user can change the volume preferential use setting whilst the call is ongoing. In this case, the user considers that the volume is too high and therefore selects a lower level volume level by pressing, or hovering over, the corresponding level bar (343) with his finger (391) (or other stylus). In this case, in response to the user selecting a preferential use setting whilst a communication is ongoing with a remote contact, the apparatus identifies the preferential use setting, and associates the identified preferential use setting with the remote contact. The preferential use setting could be an average or most popular (over the time period of the call), for example, of the volume setting during the call (e.g. if the user again adjusts the volume during the call) or the volume setting when the user actually ended the call, for example.

Figure 3F:
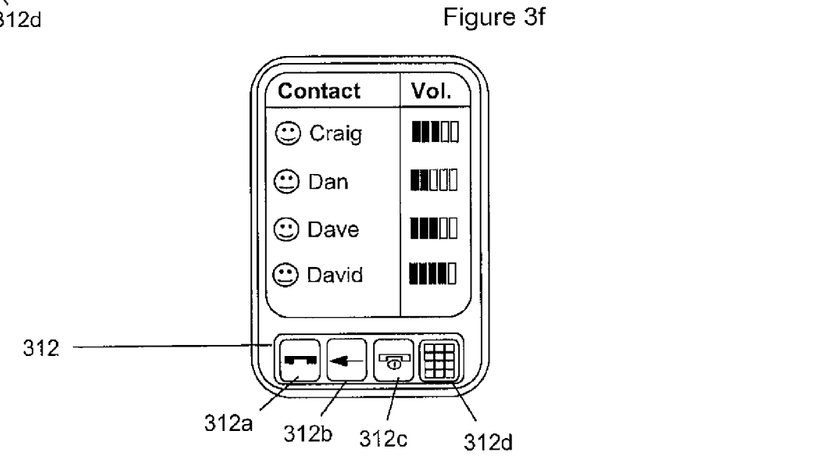

The user can continue the conversation using the adjusted volume preferential use setting. When the call is complete the user terminates the call (FIG. 3e) by selecting the terminate call icon (312c) which also returns the user to the communication application contact display screen (FIG. 3f). In this case, the apparatus is configured to store the adjusted volume preferential use setting in association with the remote contact. It will be appreciated that when the user subsequently calls the remote contact 'Dave', the apparatus will identify the adjusted volume preferential user setting which is associated with the remote contact 'Dave' and automatically activate the identified preferential use setting of the communications device. It will be appreciated that the identified use setting may be applied regardless of which device requests the communication. For example, in this case, the apparatus may be configured to activate the identified preferential use setting in response to receiving a call from the remote contact 'Dave', as well as in response to the communications device making a call to the remote contact 'Dave'.

It will be appreciated that the apparatus/communications device may be configured such that the user is also be able to adjust the preferential use settings associated with a remote contact, or with a use pattern of the communications device, when communication is not ongoing with the remote contact. For example, the communications device may be configured to provide a preferential use setting menu with which the user can interact to adjust the preferential use settings.

It will be appreciated that the apparatus may be configured to associate the preferential use setting with a remote contact on the basis of multiple calls with the remote contact. For example, the apparatus may determine the associated preferential use setting to be the most common preferential setting used during the last predetermined number of calls (e.g. the last five calls). For example, if during the last five calls to a remote contact, the user set the volume preferential use setting to level 5 twice and to level 3 three times, the apparatus would be configured to store level 5 as the preferential use setting associated with the contact.

It will be appreciated that the apparatus may be configured to activate the identified preferential use setting associated with a contact when the user initiates the communication with the associated contact and/or when the associated contact initiates the communication with the communications device.

Figure 4A:
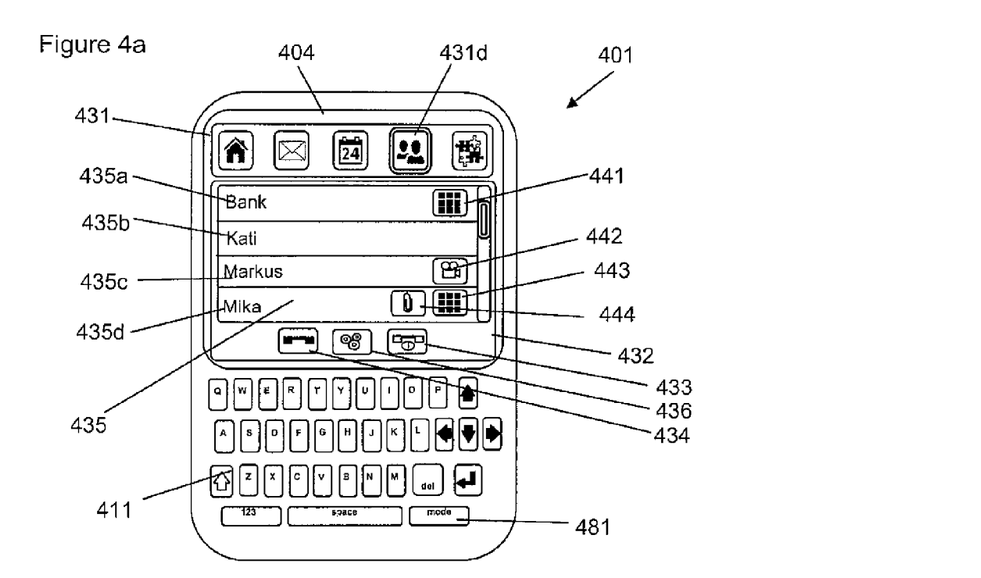
FIG. 4a-4f depicts a further example embodiment wherein the supplementary functions comprise providing a numeric keypad.

FIG. 4a illustrates a further example embodiment (401) of an apparatus such as a personal digital assistant device comprising a capacitive touch screen display (404) configured to display a graphical user interface. This embodiment also comprises a physical key user interface (411) which, in this case, is a virtual QWERTY keyboard. Like the previous embodiment, the communications device is configured to provide a number of applications. In this case, the applications include an email application, a calendar application, a communication application, and a games application. Unlike the telephone application of the previous embodiment which only provided for audio communication, the communication application, in this case, is configured to enable: calls to be made via the internet or a telephone network; files to be transferred to other devices; and video and audio communications. For this embodiment, the primary function of the communication application is to enable audio communication between the user of the communications device and a remote contact. Providing for file transfer and providing for video communications may be considered as supplementary functions.

In the situation depicted in FIG. 4a the user has opened the communication application by selecting the communication application icon (431d). When the communication application is running, the display (404) comprises: a device icon region (431), comprising other available application icons and a home screen icon; and an application region (432), the application region comprising information and user interface elements relating to the running application. In the situation depicted in FIG. 4a, the application region comprises a call initiate icon (434), configured to enable the user to initiate a call to the selected user; a call terminate icon (433), configured to enable the user to terminate an ongoing call; and a list of selectable contacts (435). In this case, each contact can be optionally associated with a range of preferential use settings.

For example, the 'Bank' contact (435a) is associated with a numeric keypad preferential use setting, which enables a virtual numeric keypad to be automatically activated on the communications device when the communications device is used to communication with the 'Bank' remote contact. This association is represented on the screen using a corresponding numeric keypad preferential use setting icon (441).

Markus is also associated with a preferential use setting—in this case a video preferential use setting indicated by the video preferential use setting icon (442). The video preferential use setting is configured such that when the communications device is used to communicate with the remote contact (in this example, 'Markus'), the video conferencing supplementary communication function of the communication application is automatically activated on the communications device.

Mika is associated with multiple preferential use settings, indicated by the attachment preferential use setting icon (443) and the numeric keypad preferential use setting icon (444). The attachment preferential use setting is configured such that when the communications device is used to communicate with the remote contact (in this example, 'Mika') the file attachment supplementary communication function of the communication application would be automatically activated on the communications device.

By using such preferential use settings, the user can tailor the behaviour of the device to each respective contact. For example, in this case, the user may often want to send files to Mika, and by enabling the attachment preferential use setting in association with that contact, this setting is activated automatically when a communication is initiated to that contact. Activating the attachment preferential use setting enables the user to send files when the communication is ongoing. Likewise, the user may preferentially wish to see Markus when communicating using the communications device (e.g. by using the videoconference supplementary communication function) and setting the device to activate that function automatically mitigates the need for the user to activate the function manually each time he wishes to perform that function.

In this example, the user wishes to call the bank. To do this, the user first selects the 'Bank' remote contact (435a) using a stylus (in this case his finger) and then selects the initiate call icon (434). The apparatus is configured, in response to the user input corresponding to initiating a call to the bank remote contact, to identify the preferential use settings of a communications device, the preferential use setting being associated with a remote contact, and being configured to provide a supplementary communication function during communications. In this case, the apparatus identifies that the numeric keypad preferential use setting is associated with the 'Bank' remote contact (435a).

Figure 4B:
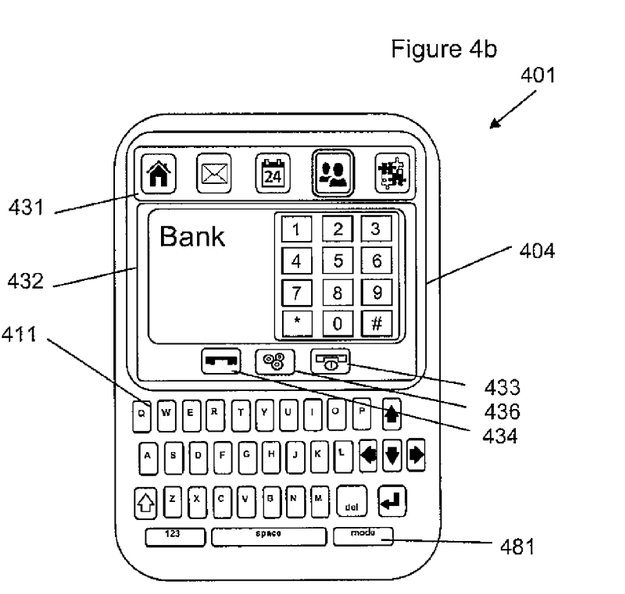

In this case, the apparatus is configured to automatically activate the identified preferential use setting of the communications device when the communications device is used to communicate with the 'Bank' remote contact. This is depicted in FIG. 4b. That is, as the apparatus has identified the numeric keypad preferential use setting as being associated with the 'Bank' remote contact, the apparatus is configured to provide a virtual numeric keypad when the communications device is in communication with the 'Bank' remote contact. In this way, the user can easily provide numeric input (e.g. to navigate an interactive voice response menu, or enter a personal identification number) without having to first manually activate the numeric keypad.

Figure 4C:
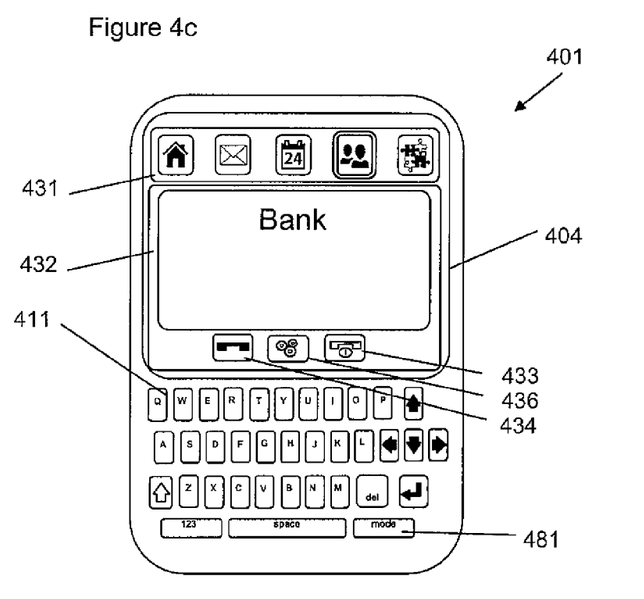

During the call, the user decides to close the virtual numeric keypad as it is no longer needed (this is depicted in FIG. 4c). When the user deactivates the numeric keypad preferential use setting, the apparatus is configured to identify the new preferential setting (i.e. the numeric keypad being deactivated) and associate the adjusted setting with the associated contact. Alternatively, the preferential use setting may keep the automatic provision to the numeric keypad particularly if this has been used before it being closed. The primary communication function of the communications device (in this case, providing for audio communication) remains in use.

Figure 4D:
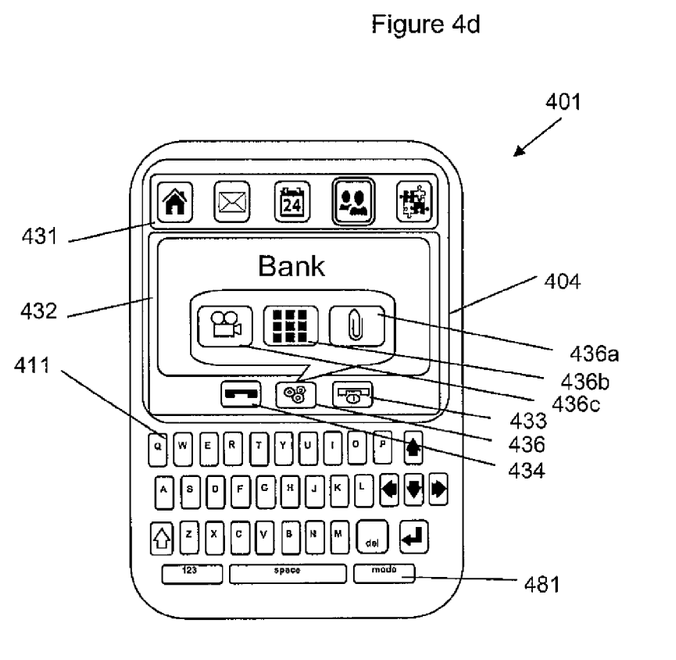

Later in the call, the user wishes to send an attachment to the 'Bank' remote contact. Enabling the transmission of file attachments is a supplementary communication function. To enable the attachment preferential use setting, the user first selects the preferential use settings icon (436), which opens a menu displaying preferential use setting icons associated with the available supplementary communication functions (436a-436b) (as depicted in FIG. 4d). In this case, the user selects the attachment preferential use setting icon (436c) which is associated with the supplementary communication function of providing for the transmission of file attachments.

Figure 4E:
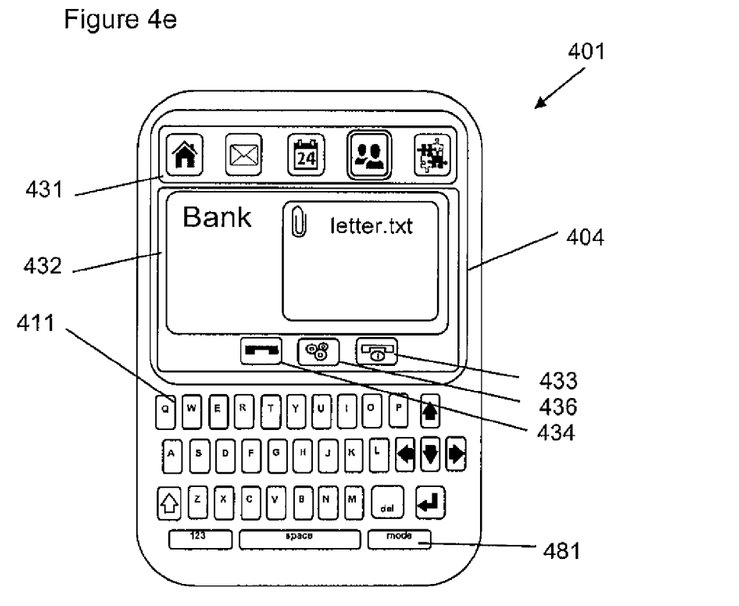

This opens a window where the user can attach documents. In the situation shown in FIG. 4e the user has attached the file 'letter.text'. The user can then send the attached file to the 'Bank' remote contact whilst the communication is ongoing.

Figure 4F:
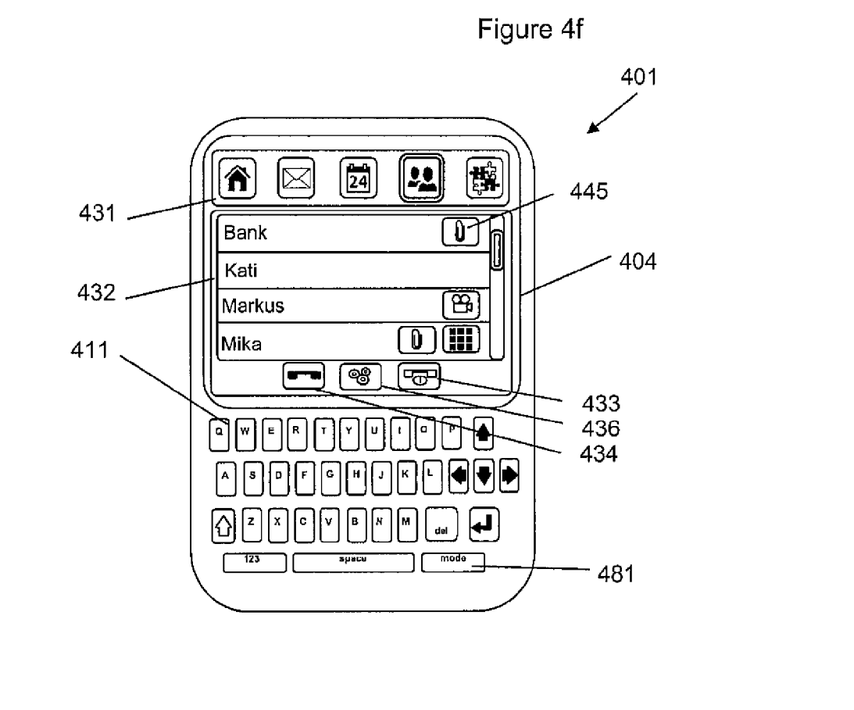

Later, when the call is finished, the communications device returns to the previous screen (as depicted in FIG. 4f). As the user had manually deactivated the numeric keypad preferential use setting whilst the communication was ongoing, the numeric keypad preferential use setting is no longer associated with the 'Bank' remote contact. However, as the user manually selected the attachment preferential use setting whilst the communication was ongoing, the attachment preferential use setting is now associated with the 'Bank' remote contact. Therefore the numeric keypad preferential use setting icon is no longer shown in association with the 'Bank' remote contact, but the attachment preferential use setting icon (445) is shown in association with the 'Bank' remote contact.

It will be appreciated that other example embodiments may be configured to provide other keypad types as a supplementary communication function. For example the keypad provided may be an alphanumeric key input area, a numeric key input area, an AZERTY key input area, a QWERTY key input area or an ITU-T E.161 key input area.

It will be appreciated that the provision of a virtual keypad may be particularly important for embodiments wherein the characters provided by the virtual keypad are not otherwise provided by the portable communications device, for example, if the communications device does not have a physical keyboard (e.g. a slate phone, or full touch screen phone), or the communications device is in a configuration where the physical keyboard is not accessible to the user (e.g. a slider phone with a retractable physical keypad). Similarly, a virtual keypad may be particularly useful when configured to provide characters not available on a physical keypad of a communications device. For example, a physical keypad may be configured to provide alphabetic characters (and not numeric characters) and the virtual keypad may be configured to provide numeric characters. In this way, the virtual keypad may supplement (or complement) the physical keypad.

Figure 5A:
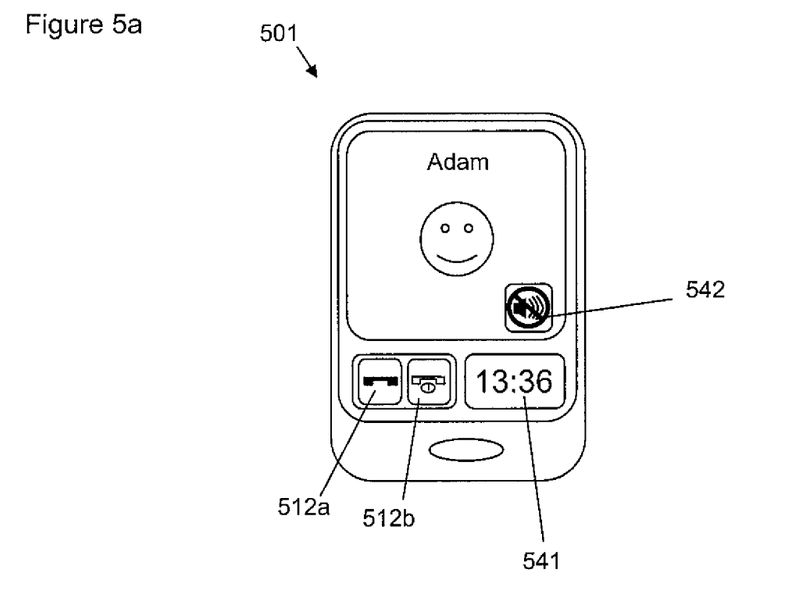
FIG. 5a-5b depicts a further example embodiment wherein the preferential use settings are based on a usage pattern of the communications device.

FIG. 5a depicts an further example embodiment (501) of a communications device, e.g. such as a mobile phone, with a user interface comprising a touch-screen user interface (305, 304), a memory (not shown), a processor (not shown) and an antenna (not shown) for transmitting and/or receiving data (e.g. emails, textual messages, phone calls, information corresponding to web pages). The communications device is configured to enable audio communication with a remote device. The primary function of providing for audio communication may be carried out in a handset mode, wherein the user holds the phone to his ear and mouth to interact with the communications device, or in a speaker mode, wherein the communications device is configured to detect the speech of the user from further away and to provide a louder audio output. The speaker mode and the headset mode may be considered preferential use settings associated with the supplementary functions of providing for audio communication in a different way.

Figure 5B:
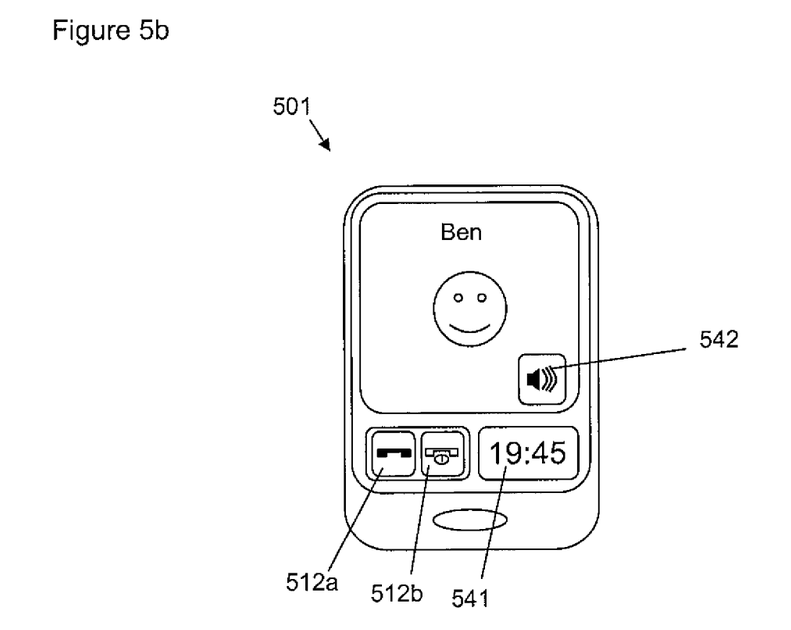

FIGS. 5a-5b depict the embodiment of FIG. 5a as the user is interacting with the communications device. FIG. 5a depicts the display of the device as the user is receiving a call from a remote contact 'Adam'. The display comprises details of the remote contact with whom the user of the communications device is communicating. The display also comprises an initiate call icon (512a) and a terminate call icon (512b), as well as a clock (541). In this case, the call was received at 13:36. At this time the user of the communications device is on the bus and, so as not to disturb his fellow passengers, has elected to deactivate the speaker mode and activate the handset mode (e.g. whilst the communication was ongoing) by selecting the mode icon (542), which is configured to allow the user to toggle between speaker mode and handset mode. In this case, the apparatus/communications device is configured to associate that time with the handset mode preferential use setting, thereby establishing a usage pattern. It will be appreciated that the device may be configured to associate a window of time with the preferential use setting. For example, if the user elected to use the handset mode preferential use setting at 13:36, the apparatus may be configured to associate times between 13:00 and 14:00 with the handset mode preferential use setting. This window of time could, for example, be a lunch time usage pattern.

Later in the day, at 19:45, the user telephones the remote contact 'Ben'. At this time, the user is at home and so wishes to use the speaker mode. During the communication, he selects the speaker mode by interacting with the mode icon (542). This toggles the speaker phone on (as depicted in FIG. 5b). In this case, the apparatus/communications device is configured to associate this time with the speaker mode preferential use setting, thereby establishing a use pattern. As in the previous case, it will be appreciated that the device may be configured to associate a window of time with the preferential use setting. For example, if the user elected to use the speaker mode preferential use setting at 19:45, the apparatus may be configured to associate times between 19:00 and 20:00 with the handset mode preferential use setting. This window of time could be an evening usage pattern. Other usage pattern groupings are possible, e.g. working day, weekend, evening etc.

When the communications device is used to communicate in accordance with the associated use pattern of the communications device, the apparatus/communications device is configured to automatically activate the associated preferential use setting of the communications device. For example, if the user were to call a remote contact at 13:36 (or in the appropriate window) the next day, the apparatus would identify that the headset mode was associated with the usage pattern and would automatically activate the headset mode preferential use setting when the communications device is used to communicate in accordance with the associated usage pattern. Likewise, if the user were to call a remote contact at 19:45 (or in the appropriate window)the next day, the apparatus would identify that the speaker mode was associated with the usage pattern and would automatically activate the speaker mode preferential use setting when the communications device is used to communicate in accordance with the associated usage pattern.

For this example embodiment, the usage pattern relates to the time of day. That is, a preferential use setting associated with a time will be activated regardless of other factors, such as the day of the week. It will be appreciated that other example embodiments may be configured to establish other usage patterns, based on, for example, the day of the week, the month, and/or the time of the year. It will be appreciated that other example embodiments may be configured to automatically activate the identified preferential use setting of the communications device when the communications device is used to communicate with an associated remote contact in accordance with the associated use pattern of the communications device i.e. usage patterns linked to a particular remote content (e.g. calling Ben in the evening can be done on speaker) rather than just evening calls can be done on the speaker mode.

In certain embodiments, unlike previous embodiments, the preferential use setting icon may not be shown when performing the primary function. Also the primary function may be other functions apart from audio calling. For example, the primary communication function may be providing textual messaging, email messaging, SMS messaging, MMS messaging or video communication. For text related primary communication functions, the secondary communications functions may include, setting the font for text, enabling or suppressing hyperlinks, enabling or suppressing emoticons.

For example, the primary function of another example embodiment may be textual messaging (e.g. via MMS messaging or email). This example embodiment may be configured to provide secondary communication functions relating to the font used for the textual message. By having associated preferential use settings, the user may be able to configure the device such that, for example, one font is automatically activated for work related remote contacts and a different font is automatically activated for personal related remote contacts (e.g. activated when starting to write a message to that particular remote contact). Other example embodiments may have preferential use settings configured to automatically enable or suppress textual enhancements (e.g. emoticons, hyperlinks).

Another example embodiment may be configured to provide for social networking messaging as a primary communication function. Secondary communication functions, associated with preferential use settings, in this case may include, for example, activating a camera to allow photographs to be taken and uploaded to one or more remote contacts of a social networking website.

Figure 6:
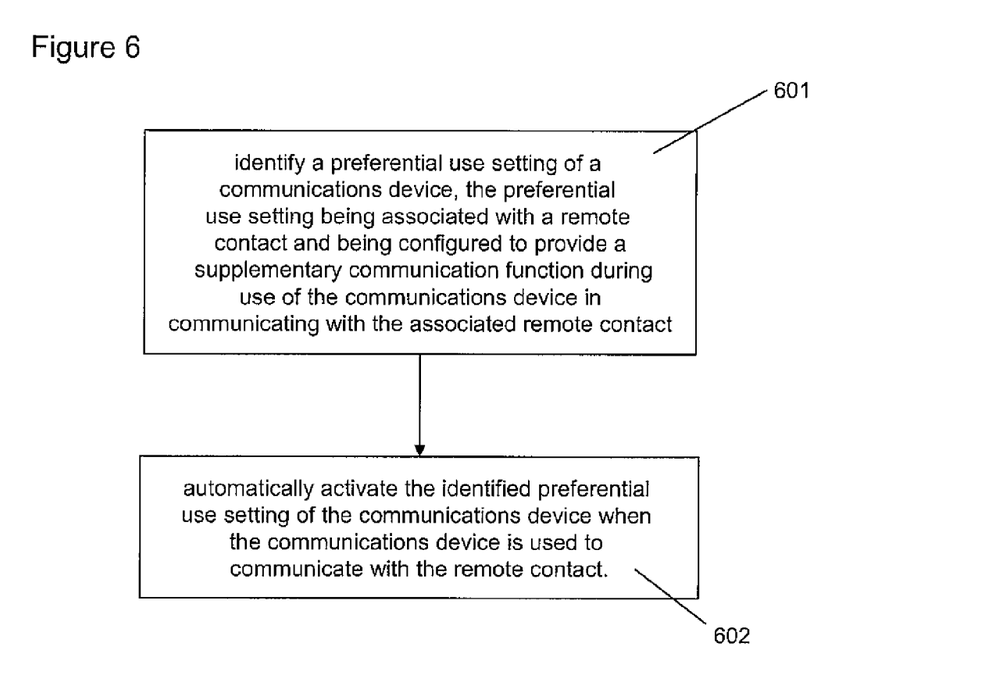
FIG. 6 depicts a flow diagram describing the method used to provide a portable electronic device with a first mode of operation and second mode of operation.

FIG. 6 shows a flow diagram illustrating the operation communications device, and is self-explanatory.

Figure 7:
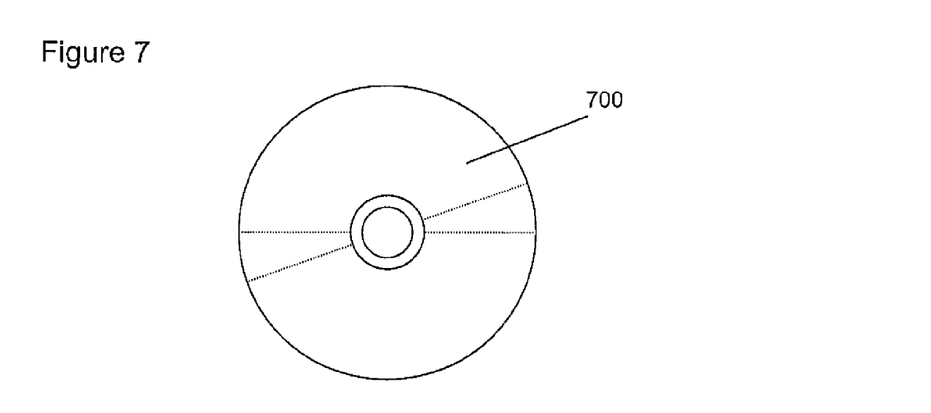
FIG. 7 illustrates schematically a computer readable media providing a program according to an example embodiment of the present invention.

FIG. 7 illustrates schematically a computer/processor readable media 700 providing a program according to an embodiment of the present invention. In this example, the computer/processor readable media is a disc such as a digital versatile disc (DVD) or a compact disc (CD). In other embodiments, the computer readable media may be any media that has been programmed in such a way as to carry out an inventive function.

It will be appreciated to the skilled reader that any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures.

The invention claimed is:

1. An apparatus comprising:
   at least one processor; and
   at least one memory including computer program code,
   the at least one memory and the computer program code configured to, with the at least one processor, cause the apparatus to perform at least the following:

identify a preferential use setting of a communications device, the preferential use setting being associated with a temporal use pattern of the communications device and being configured to provide a supplementary communication function during communications with a remote contact using a primary communication function, wherein the supplementary communication function relates to, affects or augments the primary communication function; and automatically activate the identified preferential use setting of the communications device when the communications device is used to communicate with a remote contact using the primary communication function in accordance with the associated temporal use pattern of the communications device.

2. The apparatus of claim 1, wherein the preferential use setting associated with the temporal use pattern is identified by one or more of:
determining temporal user preference settings in the communications device;
determining a temporal usage pattern of the communications device; and
determining temporal use of the communications device during one or more prior communications with a remote contact.

3. The apparatus of claim 1, wherein the preferential use setting is one or more of:
the use of a particular supplementary communication function; and
the setting of a particular communication function.

4. The apparatus of claim 1, wherein the communications device comprises default settings for the supplementary function of the communications device as well as preferential settings.

5. The apparatus of claim 1, wherein the apparatus is configured to:
automatically activate the identified preferential use setting of the communications device when communication with a remote contact is initiated.

6. The apparatus of claim 1, wherein the apparatus is configured to automatically activate the identified preferential use setting of the communications device in response to one or more of:
initiating a message to a remote contact;
receiving a call from a remote contact; and
initiating a call to a remote contact.

7. The apparatus of claim 2, wherein the remote contact is associated with multiple communication channels, and the same preferential use setting is associated with one or more of the respective multiple communications channels.

8. The apparatus of claim 2, wherein the remote contact is associated with multiple communication channels, and respective preferential use settings are provided for two or more of the respective multiple communications channels.

9. The apparatus of claim 2, wherein the remote contact is a pre-existing contact available in a stored contacts directory for the communications device.

10. The apparatus of claim 2, wherein the remote contact is associated with a new call to the communications device from a previously unknown caller.

11. The apparatus of claim 1, wherein the preferential use settings comprise the use settings of a plurality of supplementary functions.

12. The apparatus of claim 2, wherein determining temporal use of the communications device during one or more prior communications comprises determining the last setting or the most popular setting for the supplementary function.

13. The apparatus of claim 1, wherein the apparatus is configured to:
identify a preferential use setting of a communications device, the preferential use setting being associated with a temporal use pattern of the communications device, and being configured to provide a supplementary communication function during use of the communications device in a first communication with an associated remote contact; and
automatically activate the identified preferential use setting of the communications device when the communications device is used in a second communication with the remote contact.

14. The apparatus of claim 13, wherein the second communication is the immediately subsequent communication to the first communication.

15. The apparatus according to claim 1, wherein the apparatus is at least one of a portable electronic device, circuitry for a portable electronic device, a laptop computer, a desktop computer, a mobile phone, a Smartphone, a tablet PC, a personal digital assistant, the portable communications device and a module for the same.

16. A method, the method comprising:
identifying a preferential use setting of a communications device, the preferential use setting being associated with a temporal use pattern of the communications device and being configured to provide a supplementary communication function during communications with a remote contact using a primary communication function, wherein the supplementary communication function relates to, affects or augments the primary communication function; and
automatically activating the identified preferential use setting of the communications device when the communications device is used to communicate with a remote contact using the primary communication function in accordance with the associated temporal use pattern of the communications device.

17. A non-transitory computer-readable medium comprising a computer program, the computer program comprising computer program code configured to:
identify a preferential use setting of a communications device, the preferential use setting being associated with a temporal use pattern of the communications device and being configured to provide a supplementary communication function during communications with a remote contact using a primary communication function, wherein the supplementary communication function relates to, affects or augments the primary communication function; and
automatically activate the identified preferential use setting of the communications device when the communications device is used to communicate with a remote contact using the primary communication function in accordance with the associated temporal use pattern of the communications device.

* * * * *